US012780354B2

(12) United States Patent
Hu

(10) Patent No.: US 12,780,354 B2
(45) Date of Patent: Nov. 3, 2026

(54) ELECTRIC MOTORCYCLE FRAME

(71) Applicant: SHENZHEN COSWHEEL TECHNOLOGY CO., LTD, Shenzhen (CN)

(72) Inventor: Ding Hu, Shenzhen (CN)

(73) Assignee: SHENZHEN COSWHEEL TECHNOLOGY CO., LTD, Shenzhen (CN)

( * ) Notice: Subject to any disclaimer, the term of this patent is extended or adjusted under 35 U.S.C. 154(b) by 262 days.

(21) Appl. No.: 18/900,959

(22) Filed: Sep. 30, 2024

(65) Prior Publication Data

US 2025/0019033 A1 Jan. 16, 2025

(51) Int. Cl.

| | |
|---|---|
| ***B62M 7/04*** | (2006.01) |
| ***B62J 1/08*** | (2006.01) |
| ***B62J 43/16*** | (2020.01) |
| ***B62J 43/28*** | (2020.01) |
| ***B62K 11/04*** | (2006.01) |
| ***B62K 25/28*** | (2006.01) |

(52) U.S. Cl.

CPC .................. *B62M 7/04* (2013.01); *B62J 1/08* (2013.01); *B62J 43/16* (2020.02); *B62J 43/28* (2020.02); *B62K 11/04* (2013.01); *B62K 25/283* (2013.01)

(58) Field of Classification Search

CPC ............ B62M 7/04; B62K 19/30; B62J 43/28

See application file for complete search history.

(56) References Cited

U.S. PATENT DOCUMENTS

| | | | | |
|---|---|---|---|---|
| 8,672,077 B2 * | 3/2014 | Sand | B62K 25/00 180/220 |
| 9,660,236 B2 * | 5/2017 | Kondo | B62M 6/90 |
| 12,623,746 B1 * | 5/2026 | Dai | B62J 43/28 |
| 2012/0234615 A1 * | 9/2012 | Takamura | B60L 50/52 180/68.5 |
| 2023/0312053 A1 * | 10/2023 | Horuz | B62M 6/90 180/206.3 |

FOREIGN PATENT DOCUMENTS

| | | | |
|---|---|---|---|
| CN | 108357607 A * | 8/2016 | B62J 43/16 |
| CN | 119079000 A * | 12/2024 | B62M 11/04 |

* cited by examiner

*Primary Examiner* — Minnah L Seoh
*Assistant Examiner* — Hosam Shabara
(74) *Attorney, Agent, or Firm* — Leong C. Lei

(57) ABSTRACT

The present disclosure relates to the technical field of motorcycle accessories, and discloses an electric motorcycle frame, including a battery compartment. A seat bracket is mounted at one end of the battery compartment, and a motor assembling bracket is mounted at a lower end of the battery compartment. In the present disclosure, a storage battery is mounted in a battery compartment shell, and a battery compartment cover and the battery compartment shell are locked into an integral structure through a lock, which can prevent the storage battery from being stolen; and it is convenient for battery replacement and maintenance.

8 Claims, 6 Drawing Sheets

ELECTRIC MOTORCYCLE FRAME

TECHNICAL FIELD

The present disclosure relates to the technical field of motorcycle accessories, particularly to an electric motorcycle frame.

BACKGROUND

With the increasing awareness of environmental protection and the upgrading of transportation means, electric motorcycles are becoming more and more popular among people. Electric motorcycles are driven by electricity, unlike traditional motorcycles that require fuels, which greatly reduces environmental pollution. Moreover, electric motorcycles can be driven by electric power, so that the operating cost is lower, and less noise is made during driving. Therefore, electric motorcycles have been favored by people, and the frame is an important part of electric motorcycles.

Powder metallurgy bearings are formed by metal powders and other friction-reducing material powders after being pressed, sintered, shaped and impregnated with oil into a porous structure. After being soaked in hot oil, the pores are filled with lubricating oil. During work, due to the suction effect of the journal rotation and frictional heating, the metal and oil are heated to expand, and the oil is squeezed out of the pores to rub with the surface to play a lubricating role. After the bearings are cooled, the oil is sucked back into the pores. It is not needed to add lubricating oil for the powder metallurgy bearings for a long time. Therefore, powder metallurgy materials are applied to structures in motorcycles.

A Chinese patent discloses an electric motorcycle frame (Authorized Publication No. CN201737103U). The patented technology combines the motorcycle's own structural characteristics, the structure of the battery mounting portion of the frame has been designed in a focused and detailed manner while rationally arranging the connection relationships among the connecting parts, and the electric motorcycle frame has a simple and compact structure as well as a broad market prospect. However, it is inconvenient for battery replacement and maintenance, and cannot effectively protect the motor.

SUMMARY

An object of the present disclosure is to provide an electric motorcycle frame to solve the problems raised in the above background art.

In order to achieve the above object, the present disclosure provides the following technical solution:

An electric motorcycle frame includes a battery compartment, where a seat bracket is mounted at one end of the battery compartment, a motor assembling bracket is mounted at a lower end of the battery compartment, a rear fork arm is mounted at one end of the motor assembling bracket, and a rear shock absorber is mounted between the battery compartment and the rear fork arm; the motor assembling bracket includes a motor mounting frame, where side cover plates are mounted on the front and rear ends of the motor mounting frame, a battery cushion is mounted on an upper end of the motor mounting frame, a lower side of one end of the motor mounting frame is rotatably connected with a pull rod and a tension rod respectively, an anti-collision frame is mounted on the other end of the motor mounting frame, a center shaft is mounted at one end of the motor mounting frame close to the upper end of the pull rod, a set of center shaft bearings are mounted between the motor mounting frame and the center shaft, a motor is mounted on the inner side of the motor mounting frame, a sprocket is fixedly connected to an output end of the motor, a shock-absorbing connecting plate is rotatably connected to one end of the pull rod, and an access panel is mounted on the front side of one of the side cover plates.

As a further solution of the present disclosure: a chain tension roller is rotatably connected to one end of the tension rod, and a spring is connected between the tension rod and the motor mounting frame.

As a further solution of the present disclosure: one corner of the shock-absorbing connecting plate is rotatably connected to the pull rod through a rotating shaft, and the other two corners of the shock-absorbing connecting plate are rotatably connected to the rear shock absorber and the rear fork arm through corresponding rotating shafts, respectively.

As a further solution of the present disclosure: the battery compartment includes a battery compartment shell fixed on the battery cushion, a battery is mounted inside the battery compartment shell, a battery compartment cover is rotatably connected to an upper end of the battery compartment shell through a rotating shaft, a start switch is mounted at the upper end of the battery compartment shell close to one end of the battery compartment cover, a pad is mounted at the upper end of the battery compartment shell close to the other end of the battery compartment cover, and a lock is mounted between the battery compartment shell and the pad.

As a further solution of the present disclosure: a controller heat dissipation fin is fixedly mounted at one end of the battery compartment shell, a connecting frame is fixedly mounted at one end of the battery compartment shell, several heat dissipation holes are disposed on the outer side of the battery compartment shell close to the controller heat dissipation fin, a front fork hole is provided at the upper end of one side of the battery compartment shell.

As a further solution of the present disclosure: a set of long screws are mounted at the upper end of the inner side of the connecting frame, the seat bracket is fixedly mounted on the connecting frame through the long screws, a shock absorber fixing rod is mounted at the lower end of the inner side of the connecting frame, and the rear shock absorber is rotatably connected to the connecting frame through the shock absorber fixing rod.

As a further solution of the present disclosure: a rear wheel axle is mounted on one side of the rear fork arm, and the other side of the rear fork arm is connected to the center shaft.

As a further solution of the present disclosure: the center shaft bearings are made of a powder metallurgy material.

Compared with the prior art, the beneficial effects of the present disclosure are:

- The motor in the motor assembling bracket is mounted among the motor mounting frame, the side cover plates, the battery cushion, and the anti-collision frame, which ensures the safety of the motor and facilitates disassembly and maintenance;
- The chain tension roller is pressed against the lower end of the inner side of the chain, and the tension rod is pulled downward through the spring, so that the chain is always in the state of tension, which can effectively prevent the chain from falling off during riding, and ensure the safety of riding;
- The rear shock absorber, the rear fork arm, and the motor assembling bracket are rotatably connected together through the shock-absorbing connecting plate and the pull rod, so that when the rear shock absorber is deformed by impact, both the rear fork arm and the motor assembling bracket can rotate at a certain angle to play roles of shock absorption and buffering, thereby improving riding comfort;

The storage battery is mounted in the battery compartment shell, and the battery compartment cover and the battery compartment shell are locked into an integral structure through the lock, which can prevent the battery from being stolen; and it is convenient for battery replacement and maintenance.

The storage battery 111 is dissipated through the heat dissipation holes and controller heat dissipation fin to prevent the temperature of the battery from being too high.

Figure 1:
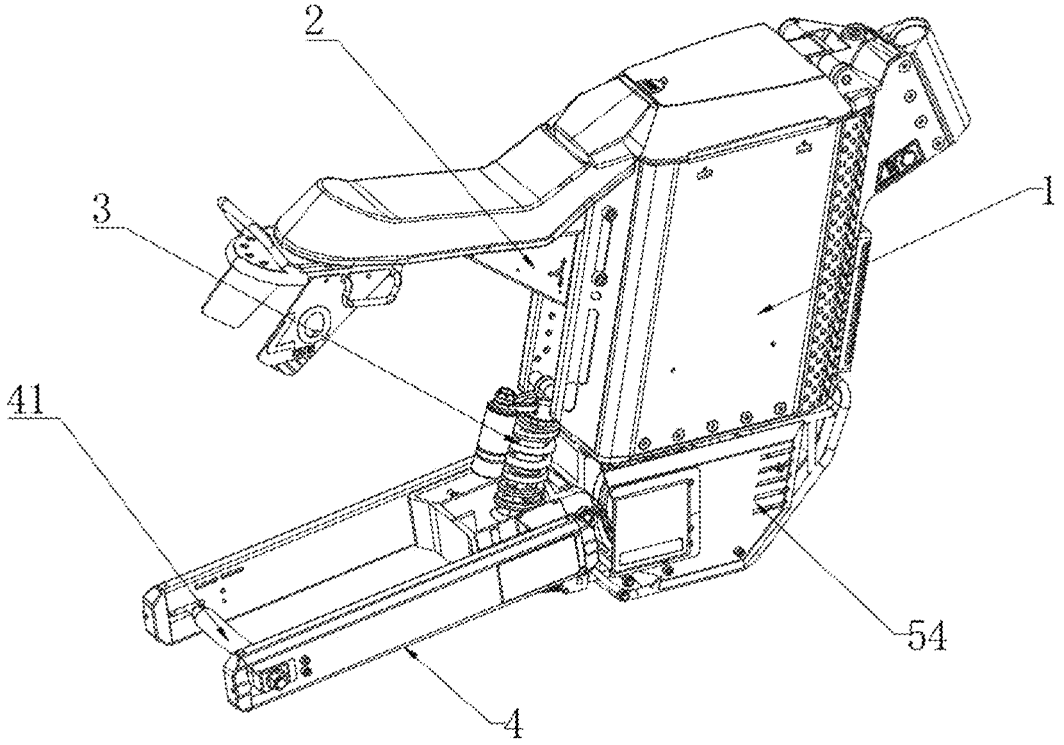
FIG. 1 is a schematic structural diagram of an electric motorcycle frame.

In the Figures: 1. battery compartment; 11. battery compartment shell; 12. heat dissipation hole; 13. controller heat dissipation fin; 14. front fork hole; 15. start switch; 16. battery compartment cover; 17. lock; 18. long screw; 19. connecting frame; 110. shock absorber fixing rod; 111. storage battery; 112. rotating shaft; 113. pad; 2. seat bracket; 3. rear shock absorber; 4. rear fork arm; 41. rear wheel axle; 5. motor assembling bracket; 51. motor mounting bracket; 52. battery cushion; 53. anti-collision frame; 54. side cover plate; 55. pull rod; 56. shock-absorbing connecting plate; 57. chain tension roller; 58. tension rod; 59. spring; 510. motor; 511. sprocket; 512. center shaft; 513. center shaft bearing; 514. access panel; 6. chain; 7. rear wheel; 8. front fork tube.

DETAILED DESCRIPTION

Referring to FIGS. 1 to 6, in an embodiment of the present disclosure, an electric motorcycle frame includes a battery compartment 1. A seat bracket 2 is mounted at one end of the battery compartment 1, and a motor assembling bracket 5 is mounted at a lower end of the battery compartment 1. A rear fork arm 4 is mounted at one end of the motor assembling bracket 5, and a rear shock absorber 3 is mounted between the battery compartment 1 and the rear fork arm 4. The rear shock absorber 3 may also be mounted on the seat bracket 2 and the rear fork arm 4 as long as the stable swing of the rear fork arm 4 within a certain range can be ensured.

Figure 2:
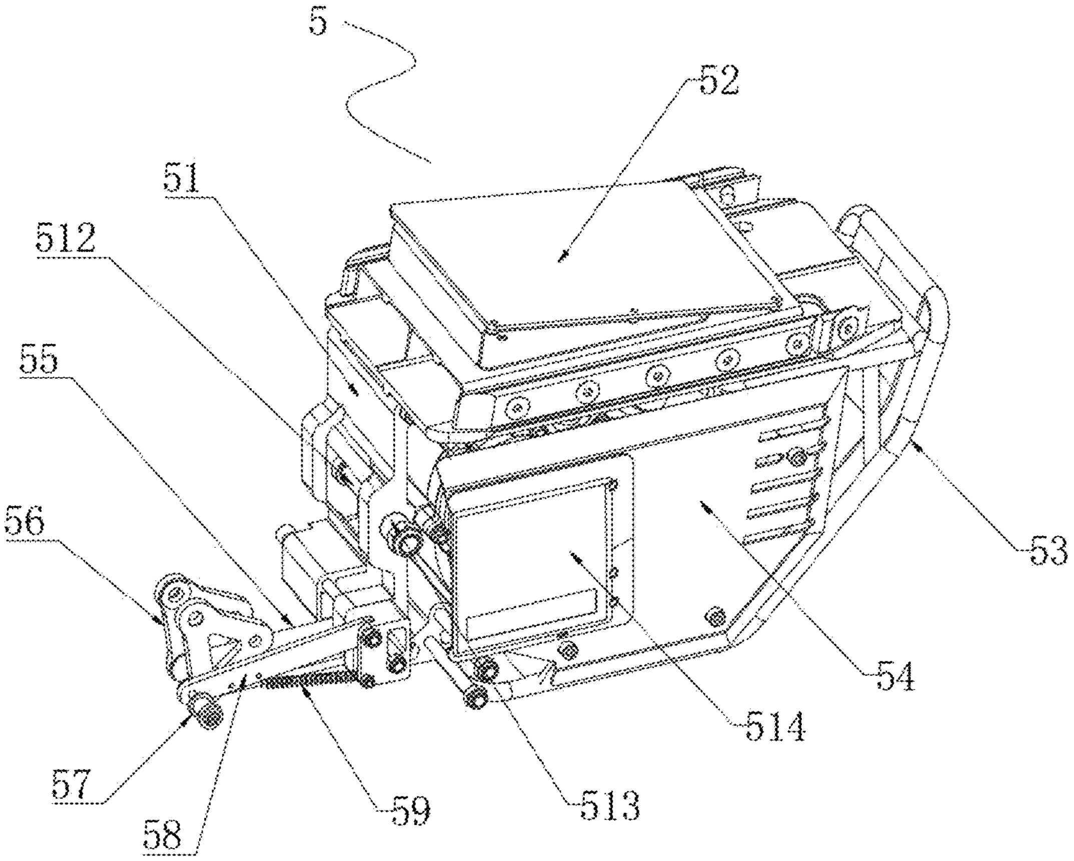
FIG. 2 is a schematic structural diagram of a motor assembling bracket in an electric motorcycle frame.
Figure 3:
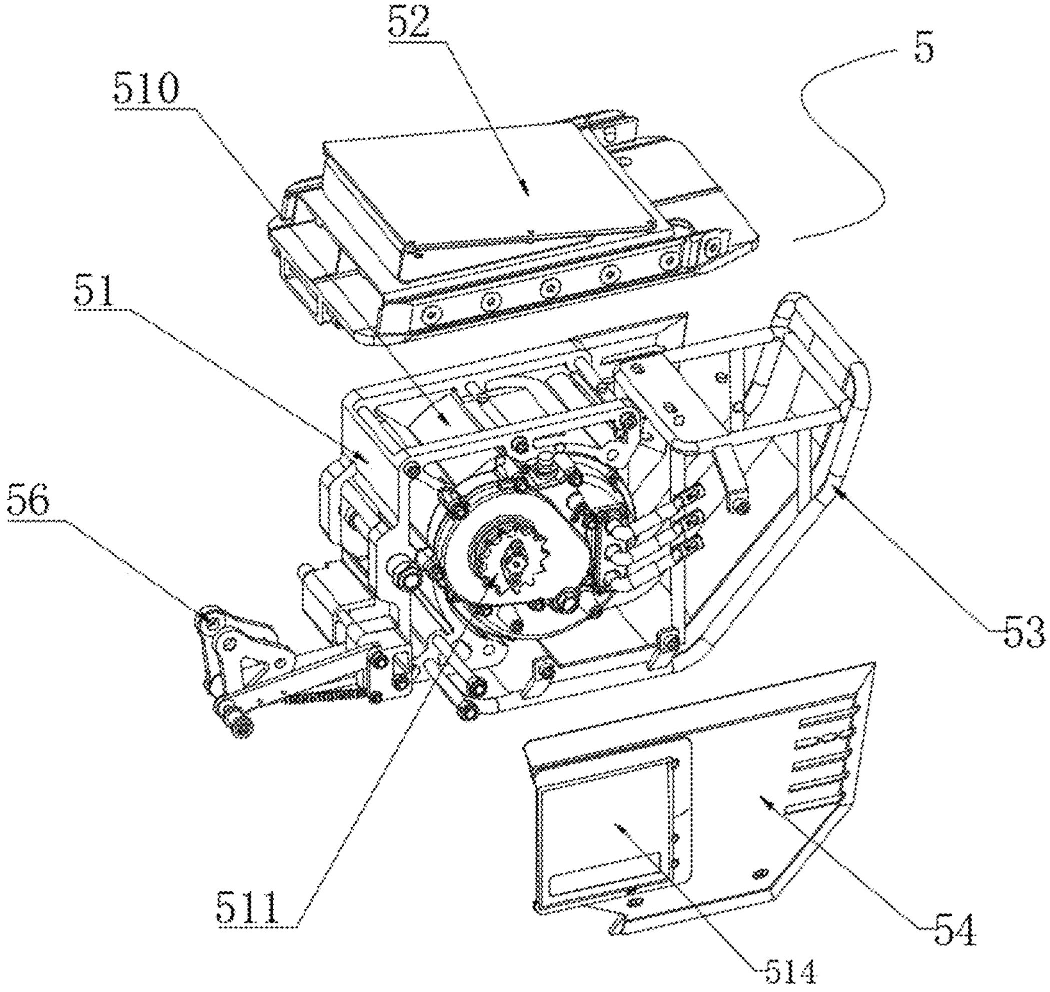
FIG. 3 is an exploded schematic structural diagram of a motor assembling bracket in an electric motorcycle frame.
Figure 6:
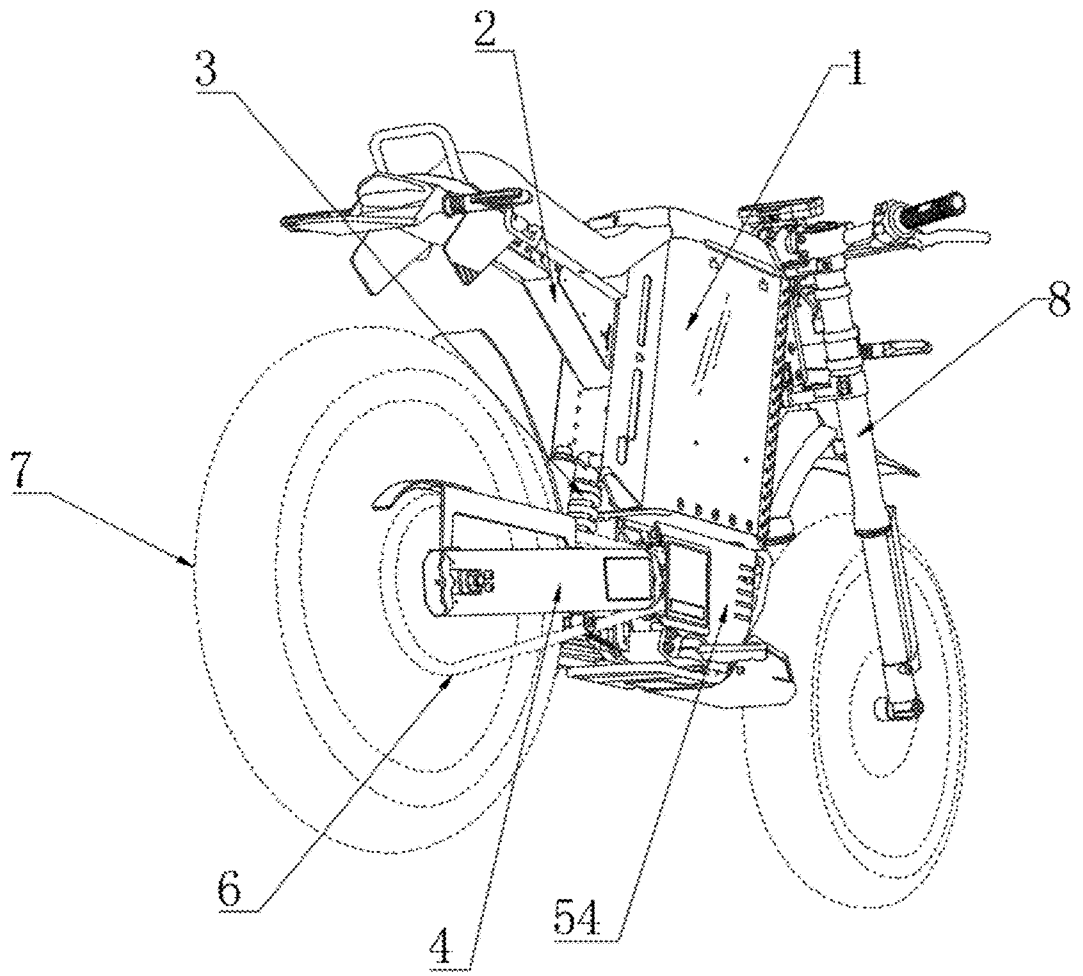
FIG. 6 is a schematic diagram of a mounting structure of an electric motorcycle.

In FIGS. 2 and 3, the motor assembling bracket 5 includes a motor mounting frame 51. Side cover plates 54 are mounted at the front and rear ends of the motor mounting frame 51, and a battery cushion 52 is mounted at the upper end of the motor mounting frame 51. A lower side of one end of the motor mounting frame 51 is rotatably connected with a pull rod 55 and a tension rod 58 respectively, and an anti-collision frame 53 is mounted at the other end of the motor mounting frame 51. A center shaft 512 is mounted at one end of the motor mounting frame 51 close to the upper end of the pull rod 55, and a set of center shaft bearings 512 are mounted between the motor mounting frame 51 and the center shaft 512. A motor 510 is mounted on the inner side of the motor mounting frame 51. The motor 510 is mounted among the motor mounting frame 51, the side cover plates 54, the battery cushion 52, and the anti-collision frame 53, which ensures the safety of the motor and facilitates disassembly and maintenance. A sprocket 511 is fixedly connected to an output end of the motor 510. As shown in FIG. 6, the sprocket 511 is connected to the chain 6 in a meshed manner. The motor 510 drives the sprocket 511 to rotate, and the sprocket 511 can drive the chain 6 and the rear wheel 7 to rotate together to achieve power transmission. A shock-absorbing connecting plate 56 is rotatably connected to one end of the pull rod 55. Center shaft bearings 513 are made of a powder metallurgy material, which have the characteristics of high hardness, high strength, and difficulty to damage. An access panel 514 is mounted on the front side of one of the side cover plates 54. After opening the access panel 514, the sprocket 511 can be inspected, maintained and overhauled. A chain tension roller 57 is rotatably connected to one end of the tension rod 58, and a spring 59 is connected between the tension rod 58 and the motor mounting frame 51. As shown in FIG. 6, the chain tension roller 57 is pressed against the lower end of an inner side of the chain 6, and the tension rod 58 is pulled downward through the spring 59, so that the chain 6 is always in the state of tension through the chain tension roller 57, which can effectively prevent the chain 6 from falling off during riding, and ensure the safety of riding. One corner of the shock-absorbing connecting plate 56 is rotatably connected to the pull rod 55 through a rotating shaft, and the other two corners of the shock-absorbing connecting plate 56 are rotatably connected to the rear shock absorber 3 and the rear fork arm 4 through corresponding rotating shafts, respectively, so that the rear shock absorber 3, the rear fork arm 4, and the motor assembling bracket 5 are rotatably connected together. Therefore, when the rear shock absorber 3 is deformed by the impact from the road surface, both the rear fork arm 4 and the motor assembling bracket 5 can rotate at a certain angle to play roles of shock absorption and buffering, thereby improving riding comfort.

Figure 4:
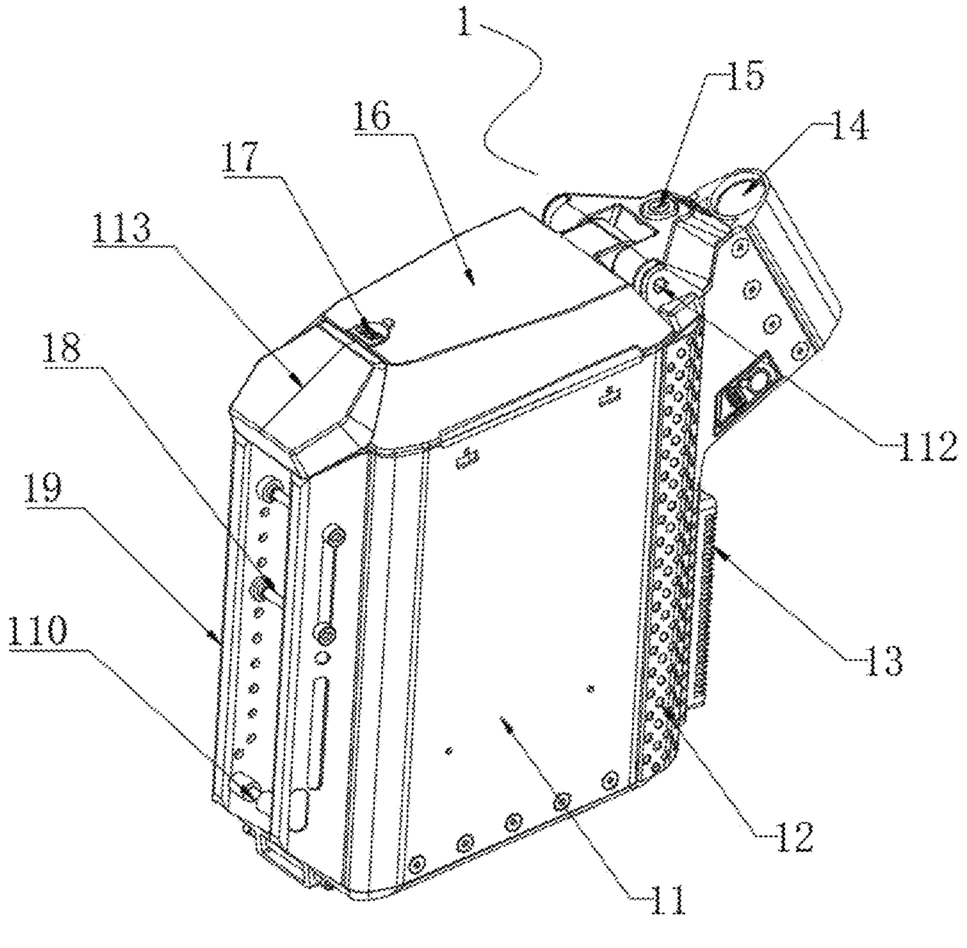
FIG. 4 is a schematic structural diagram of a battery compartment in an electric motorcycle frame.
Figure 5:
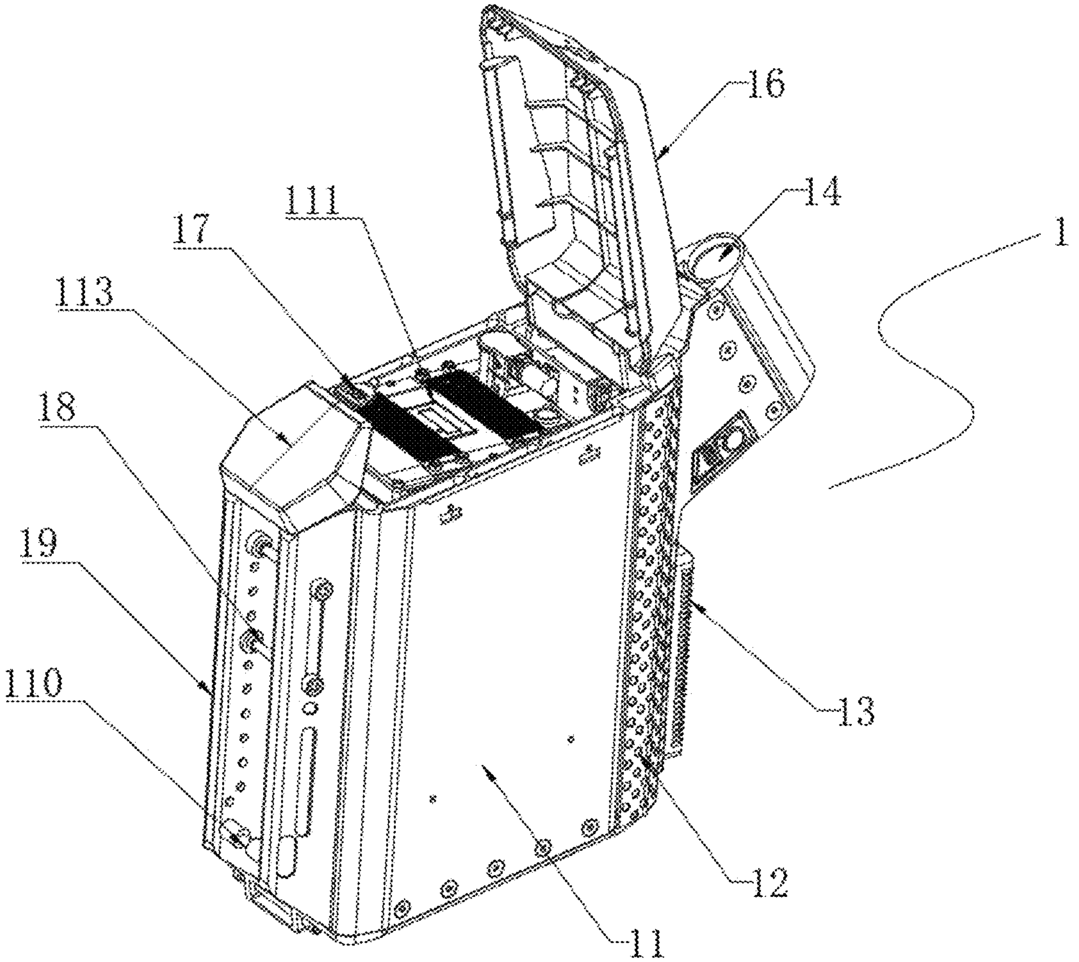
FIG. 5 is a schematic structural diagram of a battery compartment in an open state in an electric motorcycle frame.

In FIGS. 4 and 5, the battery compartment 1 includes a battery compartment shell 11 fixed on the battery cushion 52. A storage battery 111 is mounted inside the battery compartment shell 11, and a battery compartment cover 16 is rotatably connected to the upper end of the battery compartment shell 11 through a rotating shaft 112. A start switch 15 is mounted at the upper end of the battery compartment shell 11 close to one end of the battery compartment cover 16, and a pad 113 is mounted at the upper end of the battery compartment shell 11 close to the other end of the battery compartment cover 16. A lock 17 is mounted between the battery compartment shell 11 and the pad 113. The battery compartment cover 16 and the battery compartment shell 11 are locked into an integral structure through the lock 17, which can prevent the storage battery 111 from being stolen. After opening the lock 17, the battery compartment cover 16 can be rotated along the rotating shaft 112 to open the battery compartment shell 11, and then the battery 111 can be taken out from the battery compartment shell 11 to facilitate battery replacement and maintenance. A controller heat dissipation fin 13 is fixedly mounted at one end of the battery compartment shell 11, and a connecting frame 19 is fixedly mounted at one end of the battery compartment shell 11. Several heat dissipation holes 12 are provided on the outside of the battery compartment shell 11 close to the controller heat dissipation fin 13. The heat dissipation holes 12 and the controller heat dissipation fin 13 are used to dissipate heat from the storage battery 111, preventing the temperature of the battery 111 from being too high. A front fork hole 14 is disposed at the upper end of one side of the battery compartment shell 11, and the front fork tube 8 is limited through the front fork hole 14. A set of long screws 18 are mounted at the upper end of the inner side of the connecting frame 19, and the seat bracket 2 is fixedly mounted on the connecting frame 19 through the long screws 18, so that the seat bracket 2 and the battery compartment 1 are stably fixed together. A shock absorber fixing rod 110 is mounted at the lower end of the inner side of the connecting frame 19, and the rear shock absorber 3 is rotatably connected to the connecting frame 19 through the shock absorber fixing rod 110, so that the rear shock absorber 3 can rotate at a certain angle during the process of being deformed under pressure.

In FIGS. 1 and 6, a rear wheel axle 41 is mounted on one side of the rear fork arm 4, and the other side of the rear fork arm 4 is connected to the center shaft 512. By mounting the rear wheel 7 on the rear wheel axle 41, the rear fork arm 4 and the rear wheel 7 can form a whole. The rear fork arm 4 and the motor assembling bracket 5 are connected through the center shaft 512, so that the rear fork arm 4 and the motor assembling bracket 5 can swing at a certain angle to achieve shock absorption.

The above is merely preferred specific embodiments of the present disclosure, but the protection scope of the present disclosure is not limited thereto. Any equivalent substitutions or changes made by any person skilled in the art within the technical scope disclosed herein according to the technical scheme of the present disclosure and its inventive concept shall be covered within the scope of protection of the present disclosure.

The invention claimed is:

1. An electric motorcycle frame, comprising a battery compartment (1), wherein a seat bracket (2) is mounted at one end of the battery compartment (1), a motor assembling bracket (5) is mounted at a lower end of the battery compartment (1), a rear fork arm (4) is mounted at one end of the motor assembling bracket (5), and a rear shock absorber (3) is mounted between the battery compartment (1) and the rear fork arm (4); the motor assembling bracket (5) comprises a motor mounting frame (51), wherein side cover plates (54) are mounted at the front and rear ends of the motor mounting frame (51), a battery cushion (52) is mounted at the upper end of the motor mounting frame (51), the lower side of one end of the motor mounting frame (51) is rotatably connected with a pull rod (55) and a tension rod (58) respectively, an anti-collision frame (53) is fixedly mounted at the other end of the motor mounting frame (51), a center shaft (512) is mounted at one end of the motor mounting frame (51) close to the upper end of the pull rod (55), a set of center shaft bearings (513) are mounted between the motor mounting frame (51) and the center shaft (512), a motor (510) is mounted on an inner side of the motor mounting frame (51), a sprocket (511) is fixedly connected to an output end of the motor (510), a shock-absorbing connecting plate (56) is rotatably connected to one end of the pull rod (55), and an access panel (514) is mounted on a front side of one of the side cover plates (54).

2. The electric motorcycle frame according to claim 1, wherein a chain tension roller (57) is rotatably connected to one end of the tension rod (58), and a spring (59) is connected between the tension rod (58) and the motor mounting frame (51).

3. The electric motorcycle frame according to claim 1, wherein one corner of the shock-absorbing connecting plate (56) is rotatably connected to the pull rod (55) through a rotating shaft, and the other two corners of the shock-absorbing connecting plate (56) are rotatably connected to the rear shock absorber (3) and the rear fork arm (4) through corresponding rotating shafts, respectively.

4. The electric motorcycle frame according to claim 1, wherein the battery compartment (1) comprises a battery compartment shell (11) fixed on the battery cushion (52), a battery (111) is mounted inside the battery compartment shell (11), a battery compartment cover (16) is rotatably connected to the upper end of the battery compartment shell (11) through a rotating shaft (112), a start switch (15) is mounted at the upper end of the battery compartment shell (11) close to one end of the battery compartment cover (16), a pad (113) is mounted at the upper end of the battery compartment shell (11) close to the other end of the battery compartment cover (16), and a lock (17) is mounted between the battery compartment shell (11) and the pad (113).

5. The electric motorcycle frame according to claim 4, wherein a controller heat dissipation fin (13) is fixedly mounted at one end of the battery compartment shell (11), a connecting frame (19) is fixedly mounted at one end of the battery compartment shell (11), a plurality of heat dissipation holes (12) are disposed on an outer side of the battery compartment shell (11) close to the controller heat dissipation fin (13), a front fork hole (14) is disposed at an upper end of one side of the battery compartment shell (11).

6. The electric motorcycle frame according to claim 5, wherein a set of long screws (18) are mounted at the upper end of an inner side of the connecting frame (19), the seat bracket (2) is fixedly mounted on the connecting frame (19) through the long screws (18), a shock absorber fixing rod (110) is mounted at a lower end of the inner side of the connecting frame (19), and the rear shock absorber (3) is rotatably connected to the connecting frame (19) through the shock absorber fixing rod (110).

7. The electric motorcycle frame according to claim 1, wherein a rear wheel axle (41) is mounted on one side of the rear fork arm (4), and the other side of the rear fork arm (4) is connected to the center shaft (512).

8. The electric motorcycle frame according to claim 1, wherein the center shaft bearings (513) are made of a powder metallurgy material.

* * * * *